United States Patent
Eisiminger et al.

(10) Patent No.: US 12,090,517 B2
(45) Date of Patent: Sep. 17, 2024

(54) SEPARATION MACHINE HAVING POWERED SEPARATOR GAP CONTROL

(71) Applicant: Provisur Technologies, Inc., Chicago, IL (US)

(72) Inventors: Eric Eisiminger, Vernal, UT (US); Alexander Eugene Robinson, Elkhorn, WI (US)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 0 days.

(21) Appl. No.: 18/342,579

(22) Filed: Jun. 27, 2023

(65) Prior Publication Data

US 2024/0001405 A1    Jan. 4, 2024

Related U.S. Application Data

(60) Provisional application No. 63/357,170, filed on Jun. 30, 2022.

(51) Int. Cl.
*B07B 1/20* (2006.01)
*A22C 17/00* (2006.01)

(52) U.S. Cl.
CPC ............. *B07B 1/20* (2013.01); *A22C 17/00* (2013.01)

(58) Field of Classification Search
CPC .... B07B 1/20; B07B 1/22; B07B 1/18; A22C 17/00; A22C 17/004; A22C 17/04; A22C 25/16; B30B 9/241; B02C 2018/308
USPC ................................................. 209/262, 606
See application file for complete search history.

(56) References Cited

U.S. PATENT DOCUMENTS

| | | | |
|---|---|---|---|
| 3,982,483 A | 9/1976 | Bird et al. | |
| 4,003,304 A | 1/1977 | Reinhall | |
| 4,117,776 A | 10/1978 | Hunt | |
| 4,253,390 A * | 3/1981 | Hunt | B30B 9/163 99/638 |

(Continued)

OTHER PUBLICATIONS

Installation, operation, maintenance and safety instructions for Beehive RSTD06A 45HP Separator Serial#21-18776, Dec. 2019, 73 Pages.

(Continued)

*Primary Examiner* — Gene O Crawford
*Assistant Examiner* — Muhammad Awais
(74) *Attorney, Agent, or Firm* — Klintworth & Rozenblat IP LLP

(57) ABSTRACT

A hydraulically powered separator includes a separation chamber, an auger, a restrictor ring mounted at an output end of the chamber, a hydraulic cylinder having a reciprocating ram, a proportional hydraulic valve operatively coupled to the hydraulic cylinder, and a controller operatively coupled to the proportional hydraulic valve so as to control the hydraulic cylinder in a closed-loop manner. The chamber receives and processes a food product and has a cylindrical screen including a plurality of apertures. The auger is rotatably disposed within the chamber and an annular space and a volume is defined between the auger and the screen. The restrictor ring can be linearly and reciprocally displaced. Linear displacement of the restrictor ring varies a size of the volume. Movement of the ram causes pivoting movement of the restrictor ring to reduce or increase the size of the volume.

18 Claims, 14 Drawing Sheets

(56) References Cited

U.S. PATENT DOCUMENTS

| | | | |
|---|---|---|---|
| 4,340,184 A * | 7/1982 | Poss | A22C 17/04 |
| | | | 241/82.3 |
| 4,393,983 A | 7/1983 | Eriksson | |
| 4,538,324 A | 9/1985 | Prosenbauer | |
| 4,709,628 A | 12/1987 | Glowacki | |
| 4,807,816 A * | 2/1989 | Ataka | B02C 19/22 |
| | | | 241/260.1 |
| 4,915,830 A | 4/1990 | Mackay et al. | |
| 4,997,578 A | 3/1991 | Berggren | |
| 5,012,731 A | 5/1991 | Maisonneuve | |
| 5,041,055 A | 8/1991 | Roth | |
| 5,137,489 A | 8/1992 | Boster | |
| 5,160,290 A | 11/1992 | Richburg | |
| 5,213,541 A | 5/1993 | Richburg et al. | |
| 5,383,809 A | 1/1995 | Paoli | |
| 5,406,883 A | 4/1995 | Schnell et al. | |
| 5,466,108 A * | 11/1995 | Piroska | B01J 3/02 |
| | | | 100/249 |
| 5,667,435 A * | 9/1997 | Baughman | A22C 17/04 |
| | | | 241/74 |
| 5,813,909 A | 9/1998 | Goldston | |
| 6,145,766 A | 11/2000 | Mraz et al. | |
| 6,217,710 B1 | 4/2001 | Scherz et al. | |
| 6,279,471 B1 | 8/2001 | Reddoch | |
| 6,505,550 B2 | 1/2003 | Hamilton | |
| 6,615,710 B1 * | 9/2003 | Ishigaki | B01D 29/60 |
| | | | 100/48 |
| 6,622,950 B1 * | 9/2003 | Fleming | A22C 17/04 |
| | | | 241/74 |
| 7,152,522 B2 | 12/2006 | Flor | |
| 7,306,176 B1 | 12/2007 | Prince | |
| 7,347,140 B2 | 3/2008 | Scheucher et al. | |
| 7,963,218 B2 * | 6/2011 | Flor | B30B 9/12 |
| | | | 100/150 |
| 8,443,724 B2 | 5/2013 | Burke | |
| 8,561,533 B2 * | 10/2013 | Burke | B30B 11/24 |
| | | | 100/269.06 |
| 8,662,967 B1 | 3/2014 | Blanchard et al. | |
| 8,951,101 B2 | 2/2015 | Smith | |
| 9,480,266 B2 | 11/2016 | Eisiminger | |
| 10,130,105 B2 * | 11/2018 | Zhang | A22B 5/0035 |
| 10,350,605 B2 | 7/2019 | Lesar et al. | |
| 10,618,055 B2 | 4/2020 | Lesar et al. | |
| 10,842,322 B2 * | 11/2020 | Hansen | A22C 7/0069 |
| 11,173,497 B2 | 11/2021 | Wight et al. | |
| 11,179,909 B2 | 11/2021 | Miller et al. | |
| 11,203,022 B2 | 12/2021 | Wight et al. | |
| 2005/0077212 A1 | 4/2005 | Prince et al. | |
| 2011/0248109 A1 * | 10/2011 | Lesar | B02C 18/30 |
| | | | 241/79 |
| 2016/0081359 A1 * | 3/2016 | Eisiminger | A22C 17/04 |
| | | | 452/138 |
| 2018/0071746 A1 | 3/2018 | Wight et al. | |
| 2019/0283036 A1 * | 9/2019 | Rochedreux | A22C 17/04 |
| 2021/0031476 A1 * | 2/2021 | Nyara | B30B 9/18 |
| 2022/0134699 A1 * | 5/2022 | Nyara | B30B 9/121 |
| | | | 100/37 |

OTHER PUBLICATIONS

International Search Report and Written Opinion for PCT/US2023/069203 mailed dated Oct. 11, 2023, 15 pages.

* cited by examiner

HMI / OPERATION
1. Sign on Screen Powering up the equipment goes into Sign on Screen. The machine cannot be started from this screen.
2. Operator does not need to enter password and will go right to setup.
3. Supervisor and Provisur would need to enter password to access settings screen.
1. Setting Screen is used to calibrate position of the auger to the ringvalve after installation or as needed due to wear. The machine cannot be started from this screen.
2. Home position is the middle position, ideally at the middle point of the hydraulic ram with the thrust plate vertical giving an ideal clearance of .1875 inches away from the ringvalve. The default position will be 0.000.
3. Set 0 point is the offset used to keep the auger and chamber from making contact after the zero point is found. The default position is -.020 inches
4. Total travel length from the home position on the hydraulic ram is -.605+.605. for a total of 1.21. The default total travel length is 1.21 inches.
1. Setup Screen is used to set the zero point between the auger and chamber. This operation is recommend to find the zero point and home position during operation. During setup Hydraulic components are in low pressure mode. The machine cannot be stared from this screen.
2. Jog in to 0 point pushes hydraulic ram out moving the ringvalve in to contact the face of the ringvalve.
3. Jog out from 0 point is only used if a problem is found during the jog in to Zero point.

FIG. 16

4. Home position moves the hydraulic ram back and the ringvalve away from the auger to the set zero point and then back to set the home position point as defined in the settings screen.
5. Current position % displays the allowed travel from the zero point at 0% to the total travel point as defined in the settings as 100%
6. Go to Run goes to the run Screen.
1. Run Screen is used for full operation using high pressure. This will be a high pressure setting and the machine can be started at this point. Setup screen cannot be accessed unless machine is in a stopped condition.
2. Resume is used to resume the last know setting.
3. Raise Yield is used manually move the hydraulic ram out which moves the ringvalve in, raising the separation yield. Increments would be .5%
4. Lower Yield is used to manually move the hydraulic ram in which moves the ringvalve out, lowering the separation yield. Increments would be .5%
5. Current position % displays the allowed travel from the zero point at 0% to the total travel point as defined in the settings as 100%
6. Go to menu goes to menu screen to recall or set known settings.
1. Menu Screen is used to recall or save know setting for future use. Setup screen cannot be accessed unless machine is in a stopped condition.
2. Recall will recall menu 1-4. Press recall then select menu 1 to 4
3. Save settings will save current settings. Press Save Setting then select menu 1 to 4.
1. Statue Screen Display machine statue like Safeties, E-Stops, and Faults. Setup screen cannot be accessed unless machine is in a stopped condition.

**FIG. 16
CONTINUED**

SEPARATION MACHINE HAVING POWERED SEPARATOR GAP CONTROL

CROSS-REFERENCE TO RELATED APPLICATION

This application claims priority to U.S. provisional application No. 63/357,170 filed Jun. 30, 2022, the contents of which are incorporated herein in its entirety.

FIELD OF THE INVENTION

The present disclosure generally relates to a separation machine which is used to separate harder material from softer material.

BACKGROUND

Some prior art separators use manual manipulation of a restrictor ring valve of the separator in order to change the size of the restrictive annular gap, for example, by an operator manually turning a nut with a wrench, the nut being coupled to the restrictor ring valve. Other prior art separators use a hydraulically actuated restrictor ring valve under manual control. Yet other prior art separators use an electric motor and a mechanical assembly coupling the electric motor to the restrictor ring valve to change the position of the restrictor ring valve.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which:

FIG. 16 describes the operation and screens used for operation of the separation machine.

DETAILED DESCRIPTION

Figure 1:
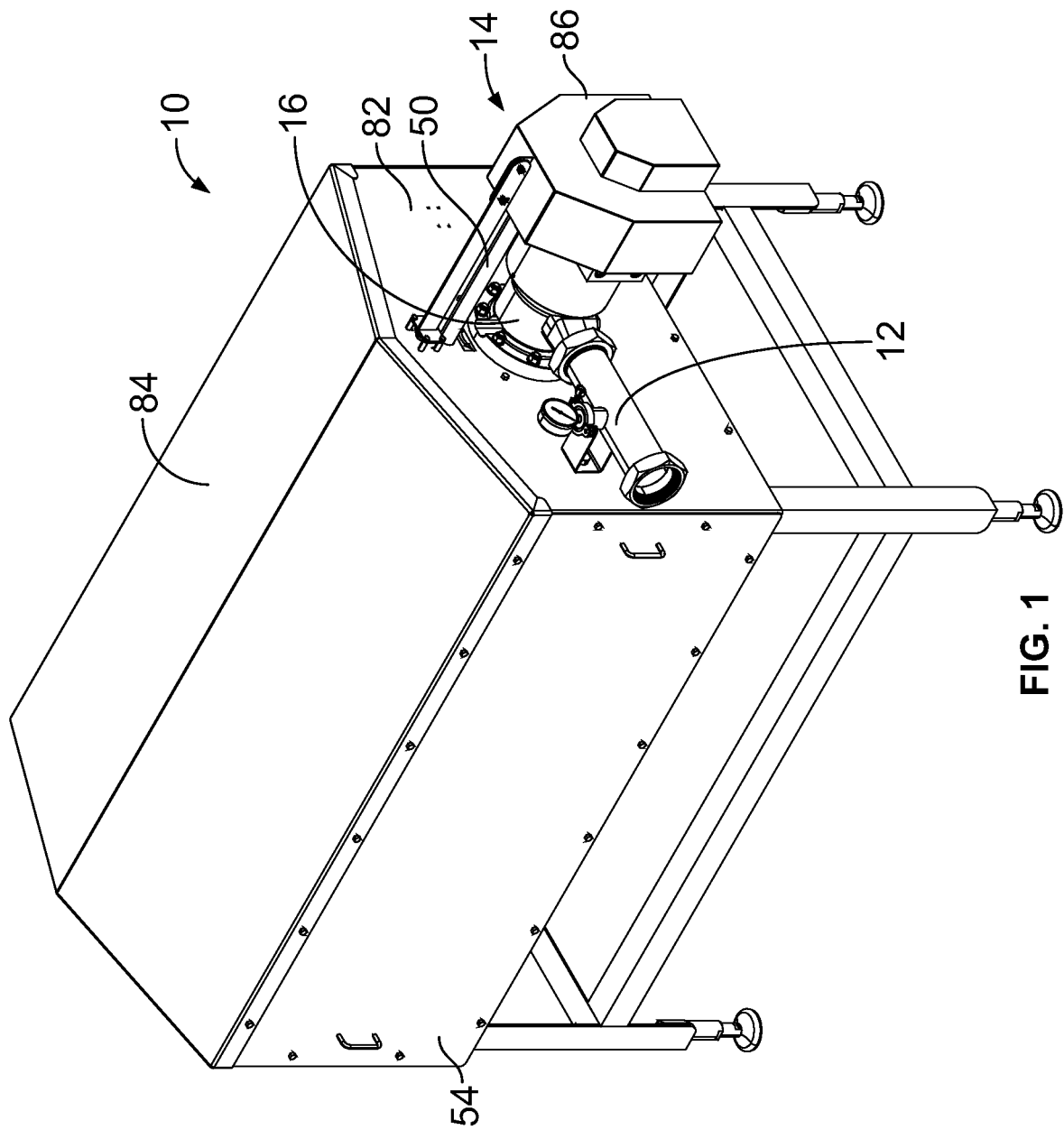
FIG. 1 depicts a perspective view of a separation machine in accordance with the present disclosure.
Figure 2:
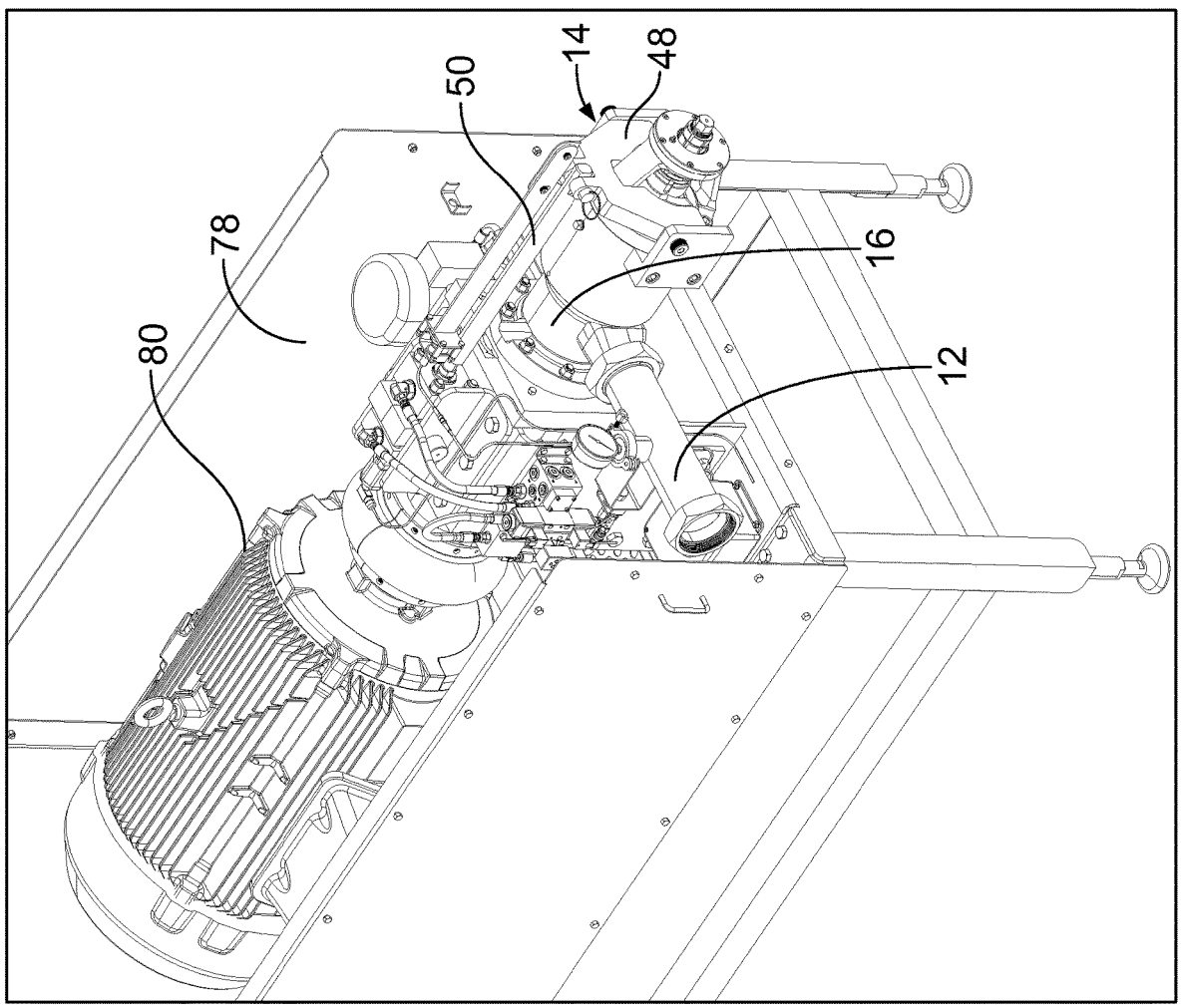
FIG. 2 depicts a partial perspective view of the separation machine with part of its housing removed so that interior components can be viewed.
Figure 3:
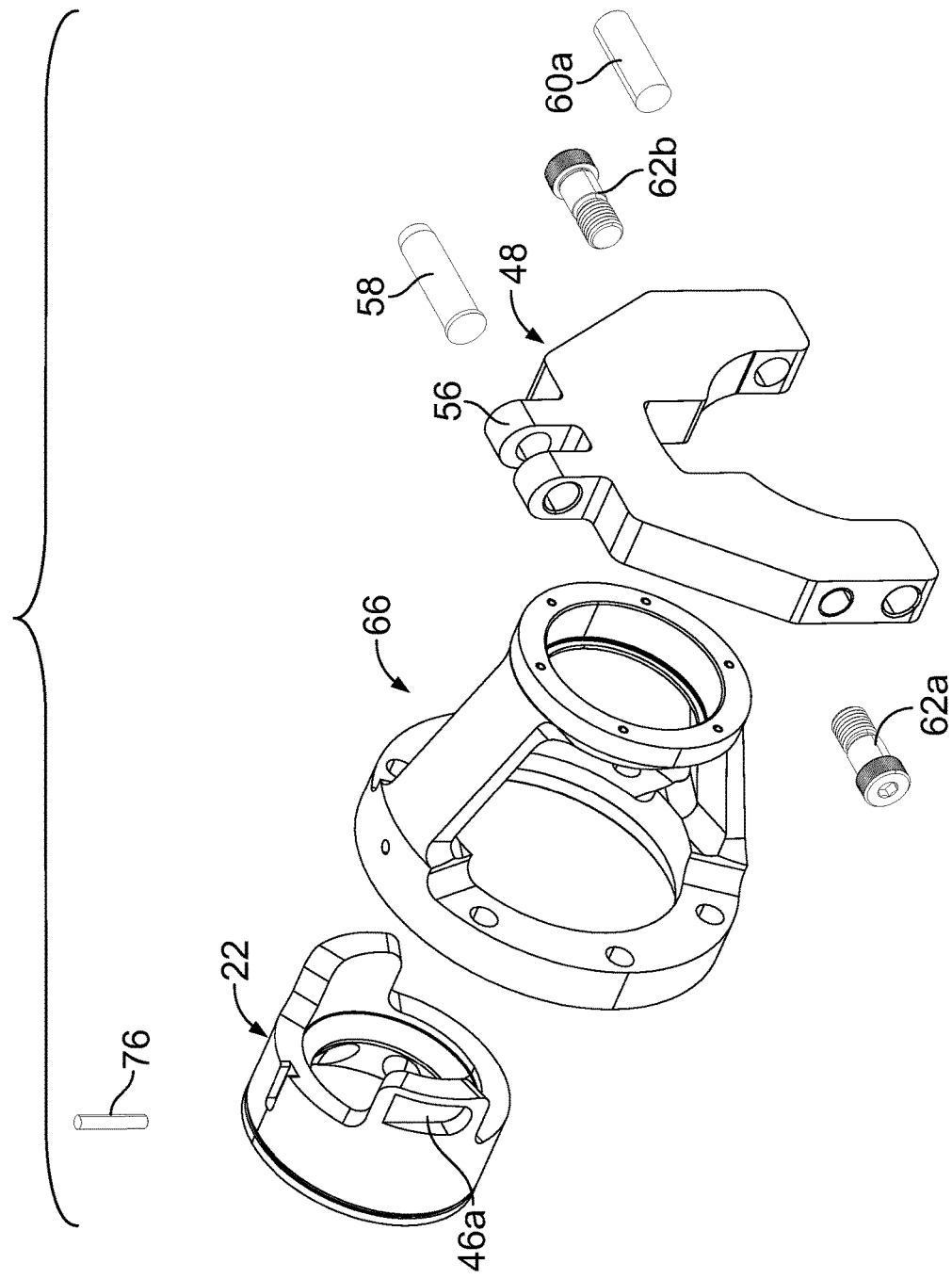
FIG. 3 depicts a perspective view of components of a separator of the separation machine shown exploded from each other.

While the disclosure may be susceptible to embodiment in different forms, there is shown in the drawings, and herein will be described in detail, specific embodiments with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

FIG. 1 shows a perspective view of a separation machine 10 which is used to separate harder material from softer material. The separation machine 10 can be configured to operate on any suitable product, for example animal parts.

Figure 4:
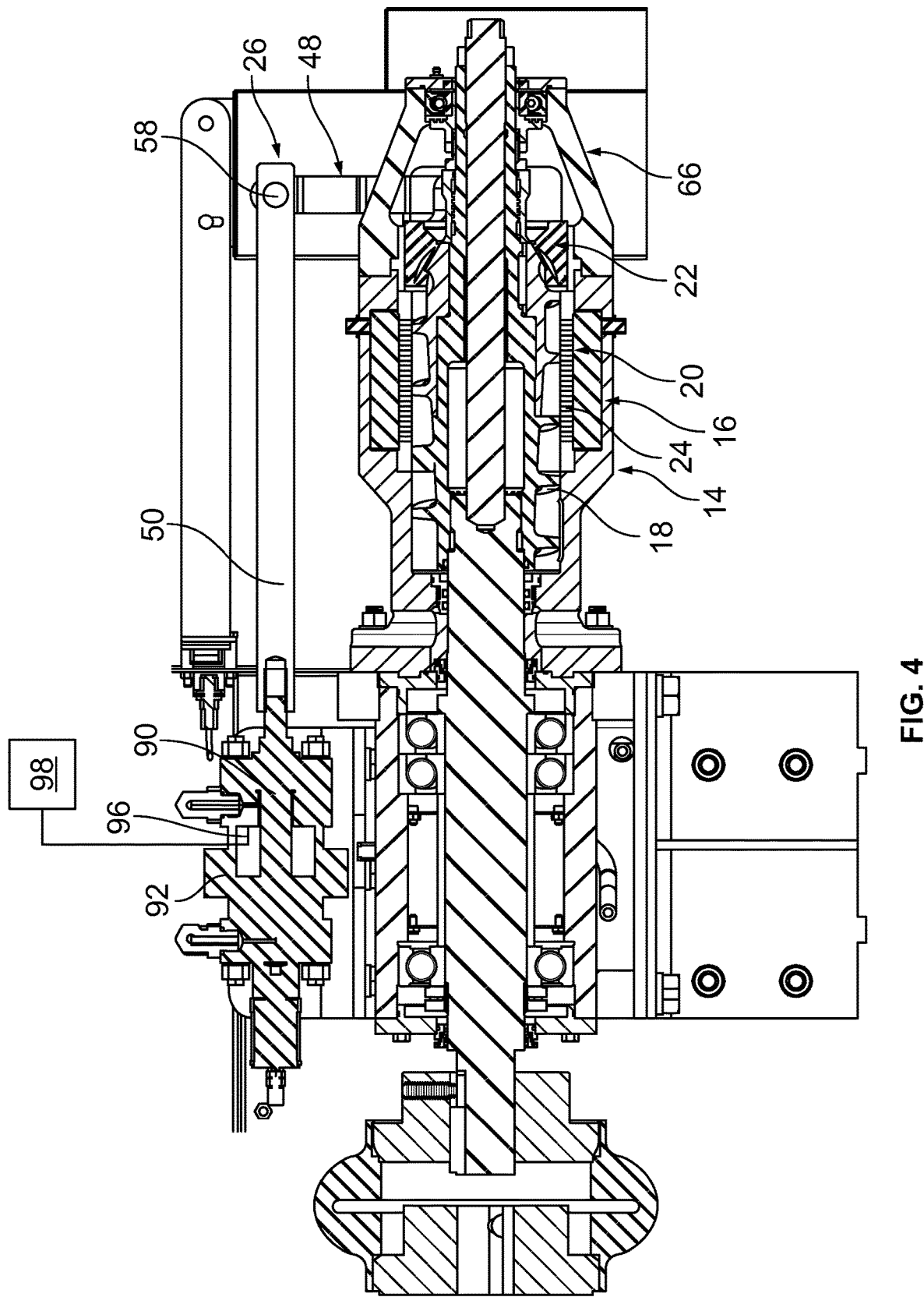
FIG. 4 depicts a cross-sectional view of the separation machine without the cover.
Figure 5:
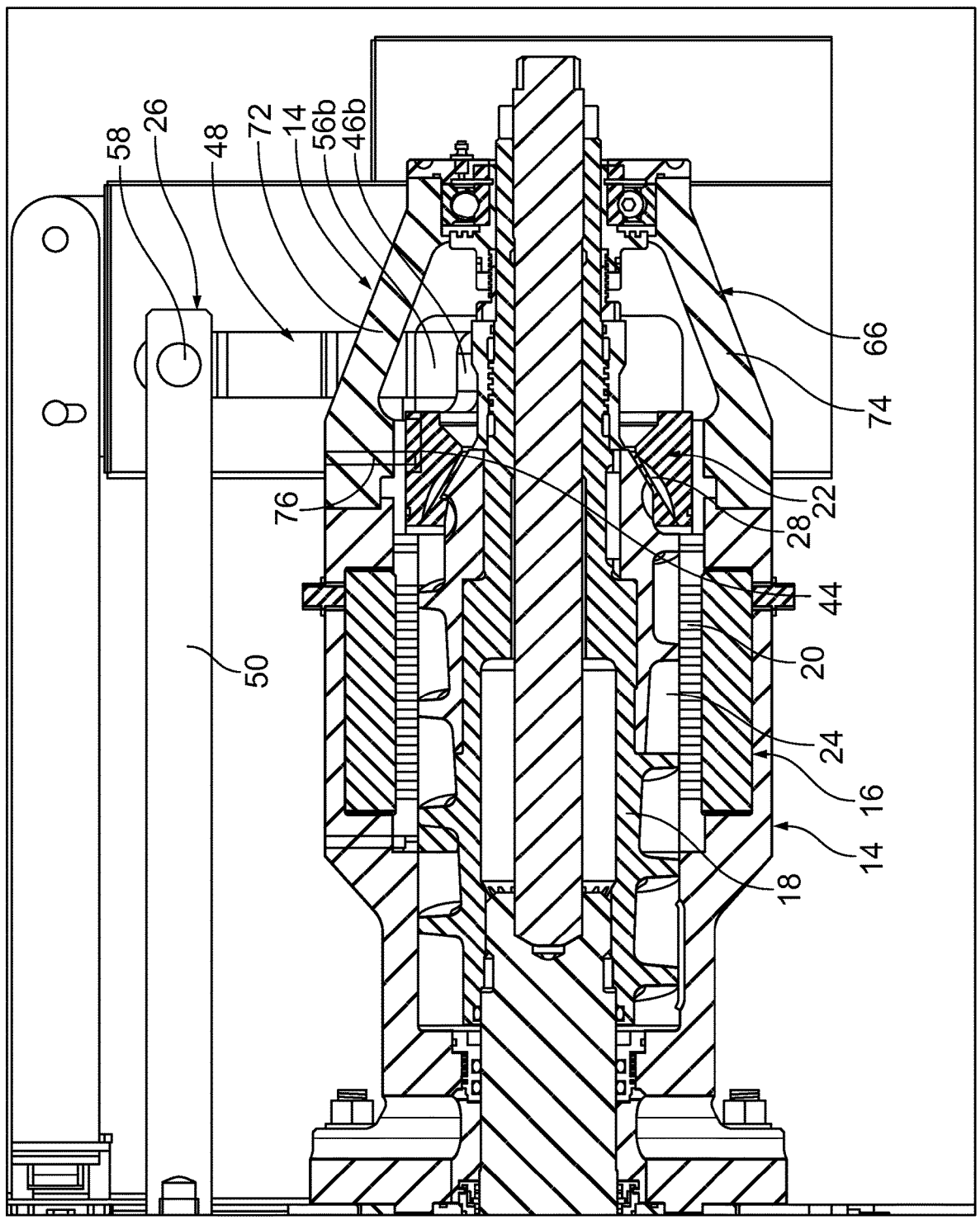
FIG. 5 depicts an enlarged cross-sectional view of a portion of FIG. 4.
Figure 6:
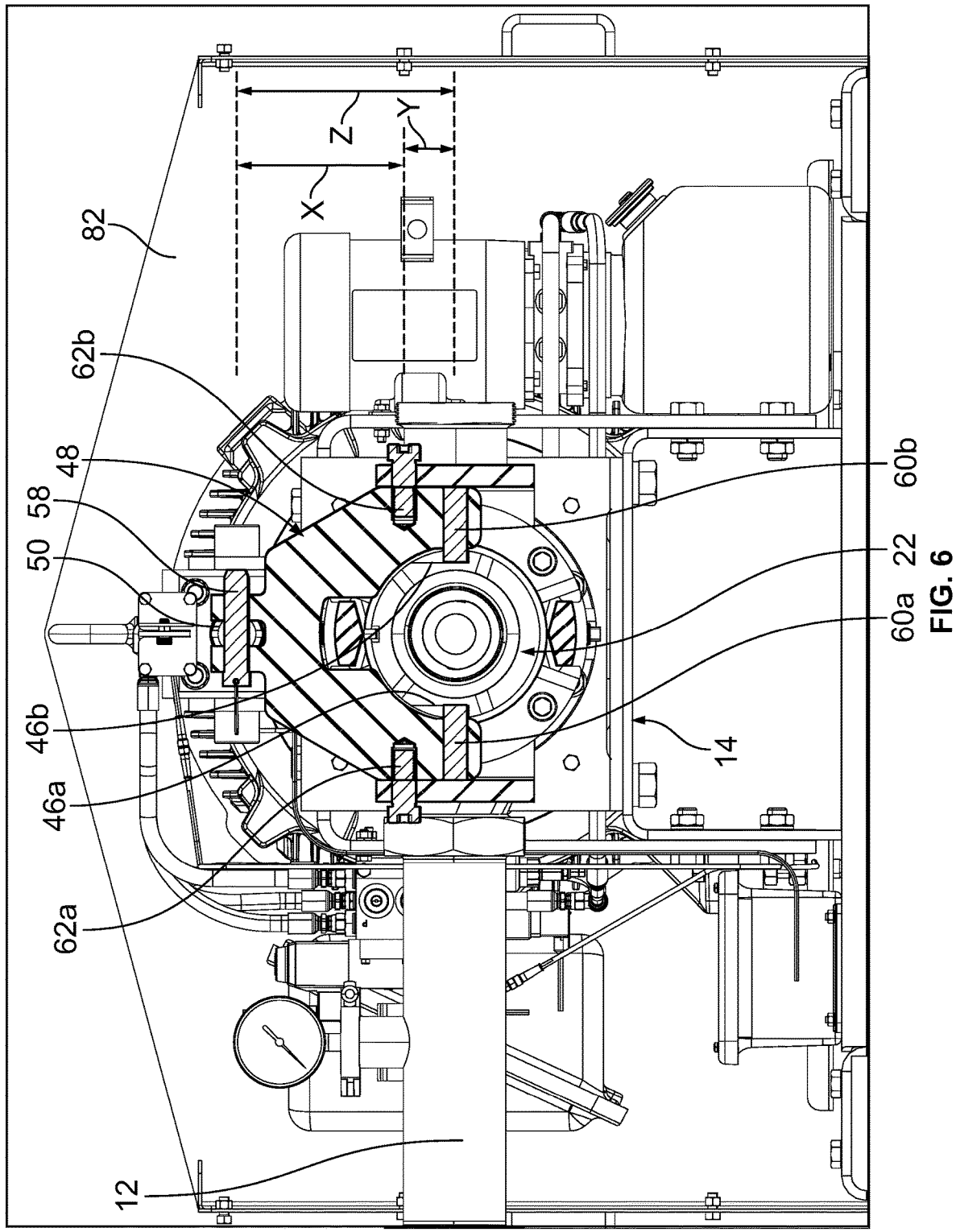
FIG. 6 depicts a cross-section view of the separation machine.

The separation machine 10 includes an input or feed tube 12 configured to feed the food product to a separator 14. As shown in FIGS. 4 and 5, the separator 14 includes a separation chamber 16 having an auger 18 and cylindrical screen 20 forming a sidewall of the separation chamber 16 disposed therein, and a restrictor ring valve 22 provided at the downstream end of the auger 18. An annular space 24 is defined between the auger 18 and the cylindrical screen 20. This annular space 24 defines a volume between the auger 18 and the cylindrical screen 20. An adjustment mechanism 26 is provided to move the restrictor ring valve 22 relative to the auger 18 to vary the size of a gap 28 provided between a downstream portion of the shaft of the auger 18 and the restrictor ring valve 22. The screen 20 can have apertures of any suitable shape(s) and size(s), such as circular, rectangular, and/or varied sizes across the screen 20. The auger 18 is driven in order to move product from left to right across the page on FIGS. 4 and 5. Product enters the separation chamber 16 from the input 12 proximate to the left side thereof, see FIG. 1, and is moved across the separation chamber 16 by threads provided on the auger 18. The auger 18 extends through the center of the separation chamber 16 and the product flows through the annular space 24 between the auger 18 and the screen 20. The annular space 24 decreases, which forces the product to flow against the screen 20. Softer portions of the product are pressed through the screen 20 and exit the separation chamber 16, while harder portions that are not pressed through the screen 20 exit out though the gap 28.

Figure 9:
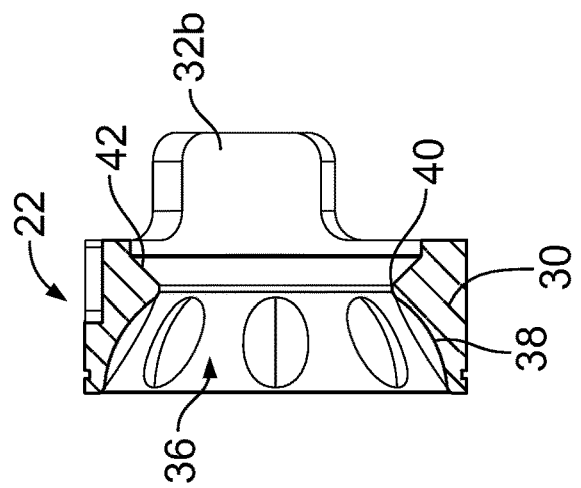
FIG. 9 depicts a cross-sectional view of the restrictor ring valve.
Figure 8:
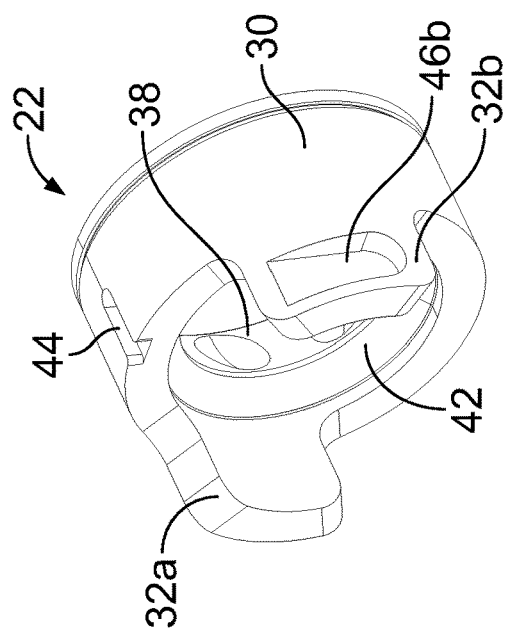
Figure 7:
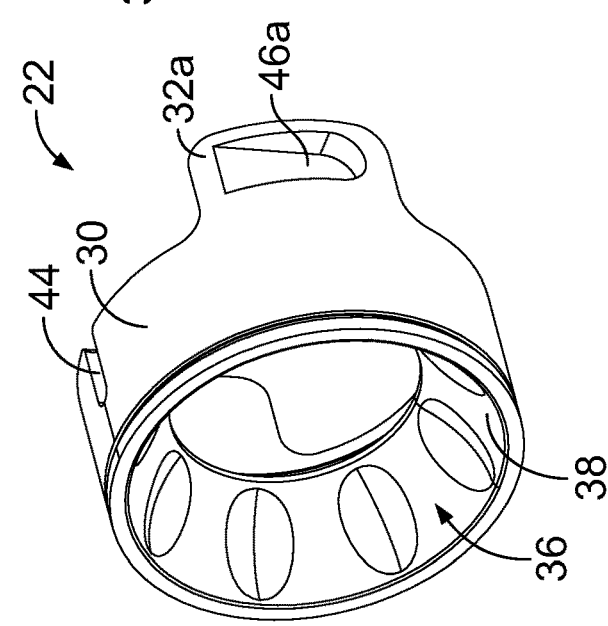
FIGS. 7 and depict perspective views of a restrictor ring valve of the separator.

The restrictor ring valve 22 is best shown in FIGS. 7-9. The restrictor ring valve 22 include a ring-shaped body portion 30 having a pair of ears 32a, 32b extending from a downstream end thereof. The outer wall surfaces of the body portion 30 and ears 32a, 32b are cylindrical. A passageway 36 is formed through the restrictor ring valve 22 and extends from the upstream end of the body portion 30 to the downstream end of the ears 32a, 32b. The passageway 36 has a concave wall portion 38 which extends from the upstream end of the body portion 30 and a which forms a throat 40 at the downstream end thereof. The downstream portion 42 of the passageway 36 may be curved.

A longitudinally extending recess 44 extends from the downstream end of the body portion 30 and the recess 44 defines a vertical axis of the restrictor ring valve 22. The ears 32a, 32b are spaced apart from each other around the circumference of the body portion 30 and are spaced from the recess 44. Each ear 32a, 32b has a pocket 46a, 46b therein which extends around the circumferentially around the respective ear 32a, 32b. An upper end of each pocket 46a, 46b is adjacent to, but spaced from, the recess 44, and a lower end of each pocket 46a, 46b is further spaced from the recess 44. The lower end of each pocket 46a, 46b may be below a horizontal axis of the restrictor ring valve 22. Each pocket 46a, 46b increases in depth from the upper end thereof to the lower end thereof. The lower end of each pocket 46a, 46b may be rounded.

The adjustment mechanism 26 includes a fork-shaped adjustment bracket 48, a driving rod 50, a hydraulic system 52 housed in a housing 54 from which the separator 14 and the driving rod 50 extend. The driving rod 50 extends outward from the housing 54 as shown in FIG. 1.

Figure 11:
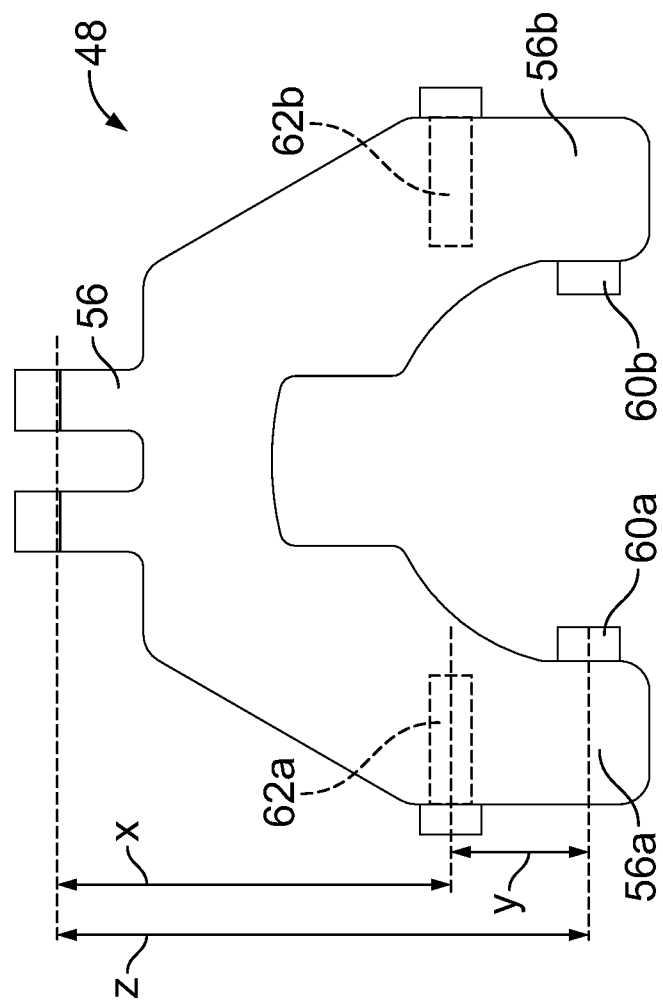
FIG. 11 depicts an end elevation view of the adjustment bracket.
Figure 10:
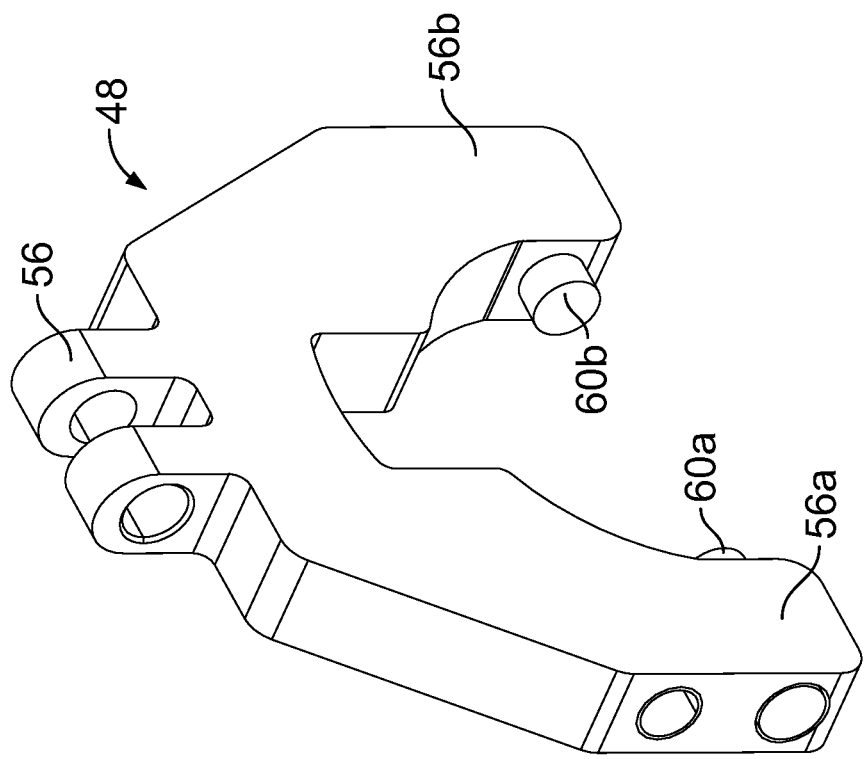
FIG. 10 depicts a perspective view of an adjustment bracket of the separator.

The adjustment bracket 48 is best shown in FIGS. 10 and 11. The adjustment bracket 48 is fork-shaped having a head 56 pivotally connected to the driving rod 50 at a driving pivot pin 58, and first and second bifurcated legs 56a, 56b depending from the head 56. Each leg 56a, 56b has lower pins 60a, 60b extending therefrom and which extends into the space between the legs 56a, 56b. The restrictor ring valve 22 is positioned within the space between the legs 56a, 56b, the pin 60a seats within the pocket 46a, and the pin 60b seats within the pocket 46b. Leg 56a is pivotally coupled to the separation chamber 16 at pivot pin or fulcrum 62a, and leg 56b is pivotally coupled to brackets of the separation chamber 16 at pivot pin or fulcrum 62b.

The hydraulic system 52 controls the linear movement of the driving rod 50 in a reciprocating motion. When the driving rod 50 is extended outward from the housing 54, the top end of the adjustment bracket 48 is pushed outward and the adjustment bracket 48 pivots relative to the separation chamber 16 around pivot pins or fulcrum 62a, 62b. Since the adjustment bracket 48 is coupled to the restrictor ring valve 22 by the lower pins 60a, 60b within the pockets 46a, 46b, the restrictor ring valve 22 linearly translates toward the auger 18 to reduce the size of the gap 28.

Conversely, when the driving rod 50 is moved inward into the housing 54, the top end of the adjustment bracket 48 is moved inward and the adjustment bracket 48 pivots relative to the separation chamber 16 around pivot pins 62a, 62b. Again, since the adjustment bracket 48 is coupled to the restrictor ring valve 22 by the pins 60a, 60b within the pockets 46a, 46b, the restrictor ring valve 22 linearly translates away from the auger 18 to increase the size of the gap 28. The pivotal movement of the adjustment bracket 48 around pivot pins 62a, 62b is converted to linear movement of the restrictor ring valve 22.

The driving pivot pin 58 is spaced a distance X above the pivot pins or fulcrum 62a, 62b. The pivot pins 62a, 62b that provide the fulcrum are spaced a distance Y above the lower pins 60b. A distance Z is defined between the driving pivot pin 58 and the lower pins 60a, 60b. The distance X is greater than one half of the distance Z, and preferably two-thirds or more of the distance Z (as best shown in FIG. 11). As a result, a large movement of the driving rod 50 by hydraulic system 52 causes a small movement of the restrictor ring valve 22. This provides a mechanical advantage, which may be 3:1.

In summary, the adjustment bracket 48 is operatively coupled to the driving rod 50 at a first end, and operatively coupled to the restrictor ring valve 22 at a second end, where the second end is disposed opposite the first end. The adjustment bracket 48 further includes the fulcrum point defined by pivot pins 62a, 62b, disposed between the first and second ends about which the adjustment bracket 48 pivots. In one embodiment, the fulcrum point is located at a position closer to the second end of the adjustment bracket 48 than to the first end of the adjustment bracket 48. In another embodiment, a distance from the fulcrum to the first end of the adjustment bracket 48 is about twice the distance compared to a distance from the fulcrum to the second end of the adjustment bracket 48, so as to provide the above-described mechanical force advantage of about 3:1.

Figure 13:
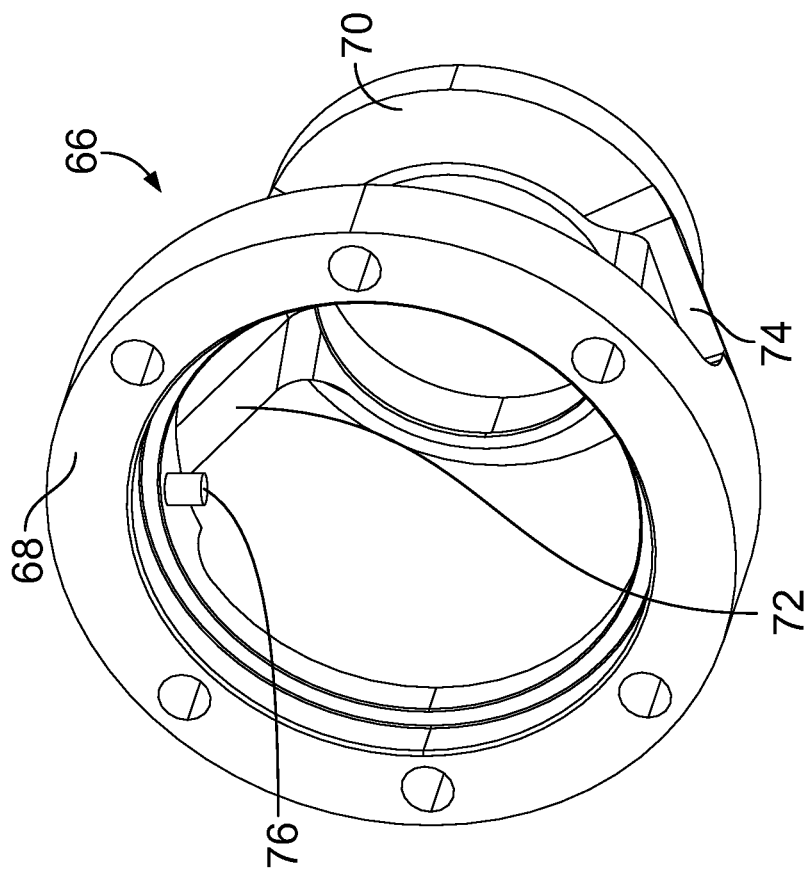
FIGS. 12 and 13 depict perspective views of a front casing of the separator.
Figure 12:
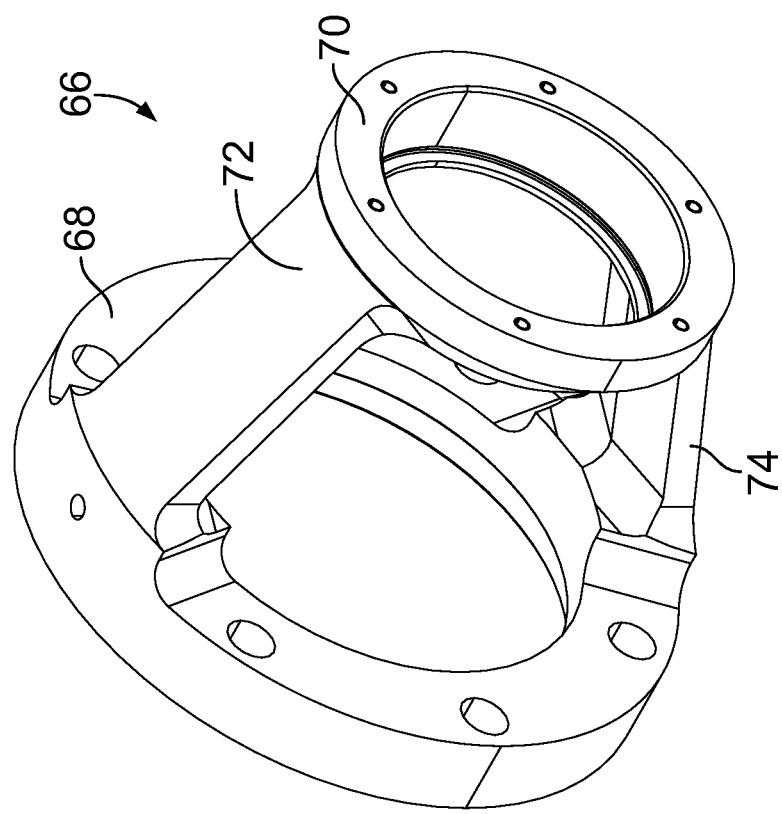

A front casing 66, which is best shown in FIGS. 12 and 13, is fixedly coupled to the end of the separation chamber 16 and surrounds the restrictor ring valve 22. The front casing 66 has a rear ring 68, a front ring 70, and a pair of opposed apart arms 72, 74 extending between the rings 68, 70. The rear ring 68 is fixedly coupled to the end of the separation chamber 16. Arm 72 extends between the legs 56a, 56b of the adjustment bracket 48. A pin 76 extends from the rear ring 68 and into the passageway formed thereby. The pin 76 seats within the longitudinally extending recess 44 of the restrictor ring valve 22. The pin 76 forms a stop and limits the amount of travel of the restrictor ring valve 22 that can be moved away from the auger 18 to increase the size of the gap 28.

The housing 54 includes a cavity 78 in which a motor 80 that drives the auger 18 is housed, and in which the hydraulic system 52 is also housed. The driving rod 50 extends through an opening in a front wall 82 of the housing 54, and the separator 14 is cantilevered from the front wall 82. An upper end of the cavity 78 is closed by a top cover 84. A guard housing 86 covers the outer end of the separator 14 and the driving rod 50, and covers the adjustment bracket 48.

Figure 14:
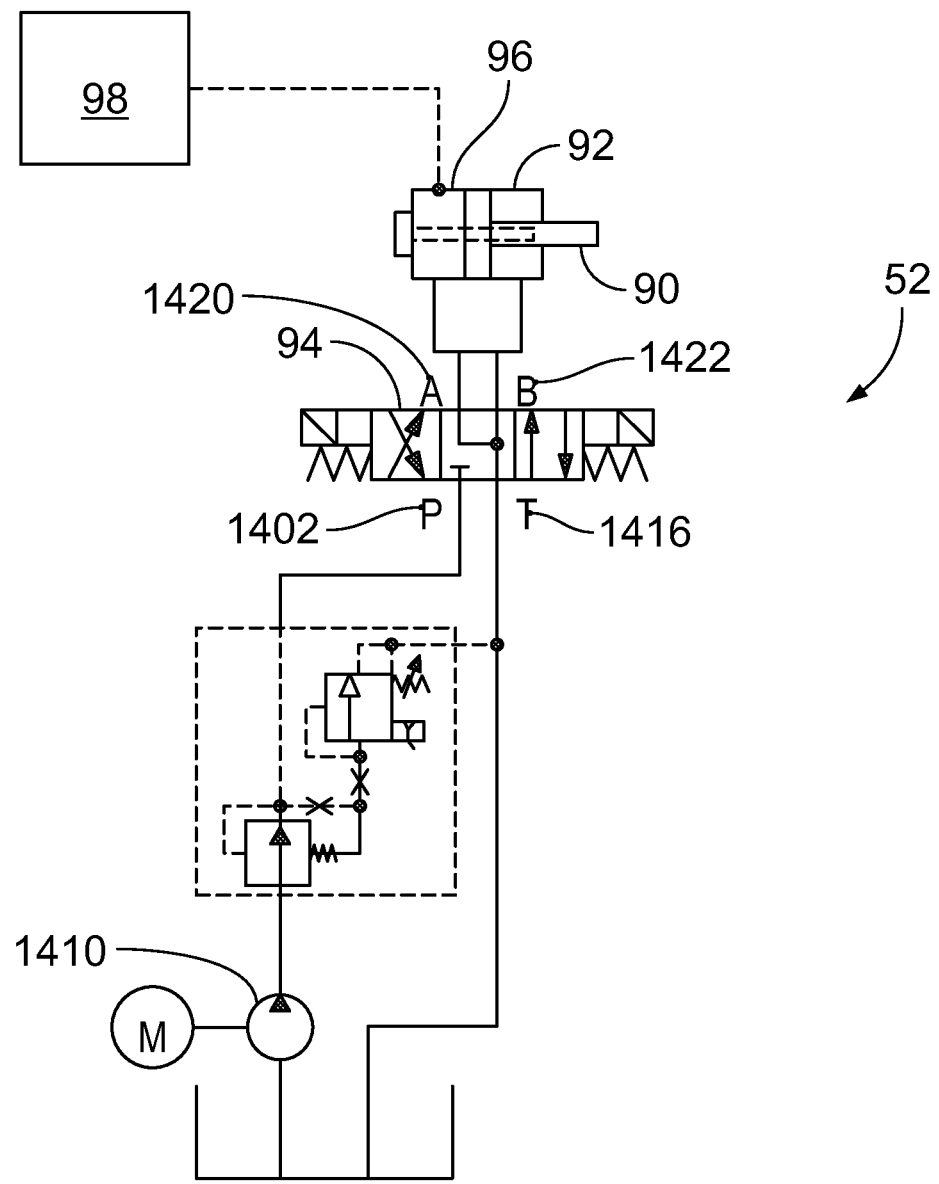
FIGS. 14 and 15 depict schematic views of a hydraulic system or subsystem of the separation machine.
Figure 15:
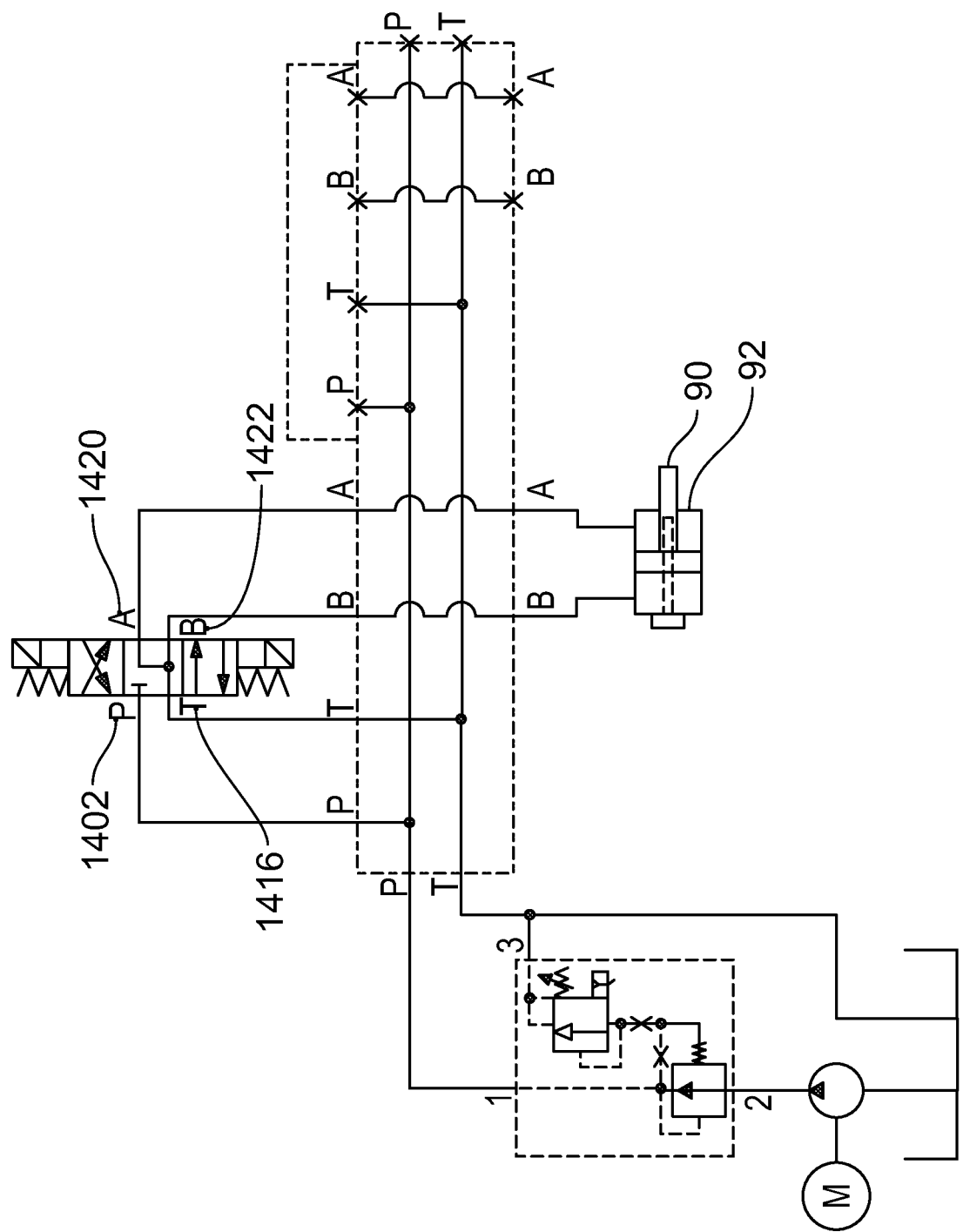

As schematically shown in FIGS. 14 and 15, the hydraulic system 52 includes a hydraulic ram 90 movable within a cylinder 92 under hydraulic pressure from a hydraulic medium, a proportional hydraulic valve 94 which is operated to move the hydraulic ram 90, and a position sensor 96 within or operative with the cylinder 92. The position sensor 96 senses the position of the hydraulic ram 90 relative to the cylinder 92 and outputs a signal, for example a 4 mA to 20 mA signal, to a controller 98, which varying electrical signal is proportional to a position of the ram relative to the cylinder, and which is received by the controller 98.

Referring to FIGS. 1-4, the proportional hydraulic valve 94 and the hydraulic cylinder 92 may comprise a hydraulic subsystem, which in a preferred embodiment, is physically located within the housing 54 or housing cavity 78, so that it is physically isolated from the separation chamber 16 to avoid contamination by food products. Note that the hydraulic cylinder 92 is preferably disposed in a horizontal position parallel to a longitudinal axis of the separation chamber 16, which in some situations, may simplify selection of the proportional valve 94 regarding certain check valves and reducing valves. Accordingly, the ram 90 also reciprocally extends and retracts in a horizontal direction parallel to the separation chamber 16.

As described although the hydraulic subsystem may be located within the housing 54, the driving rod 50 is preferably disposed externally relative to the housing 54 and external relative to the separation chamber 16, as the driving rod 50 is operatively coupled between the ram 90 and the adjustment bracket 48. In some embodiments, an external pressure gauge may be operatively coupled to the driving rod 50 configured to provide a visual indication of a level of pressure exerted by the ram 90.

The hydraulic ram 90 is operatively coupled to the driving rod 50, which is in turn, operatively coupled to the adjustment bracket 48. When the position of the hydraulic ram 90 relative to the cylinder 92 is sensed by the position sensor 96 which provides the controller 98 with information regarding the position of the ram 90, the controller 98 then, in turn, accurately determines the position of the restrictor ring valve 22 relative to the auger 18.

In one embodiment, the proportional hydraulic valve 94 may be a three-position floating-center, proportional valve with dual-solenoid activation, having a conventionally defined inputs and outputs, such as a supply port (P) 1402 from a pump 1410, a tank or reservoir return (T) 1416, and the work ports (A) 1420 and (B) 1422, which are connected to the hydraulic cylinder 92. The hydraulic valve 94 may be a commercially available valve available from Parker Hannifin, NA.

Figure 17:
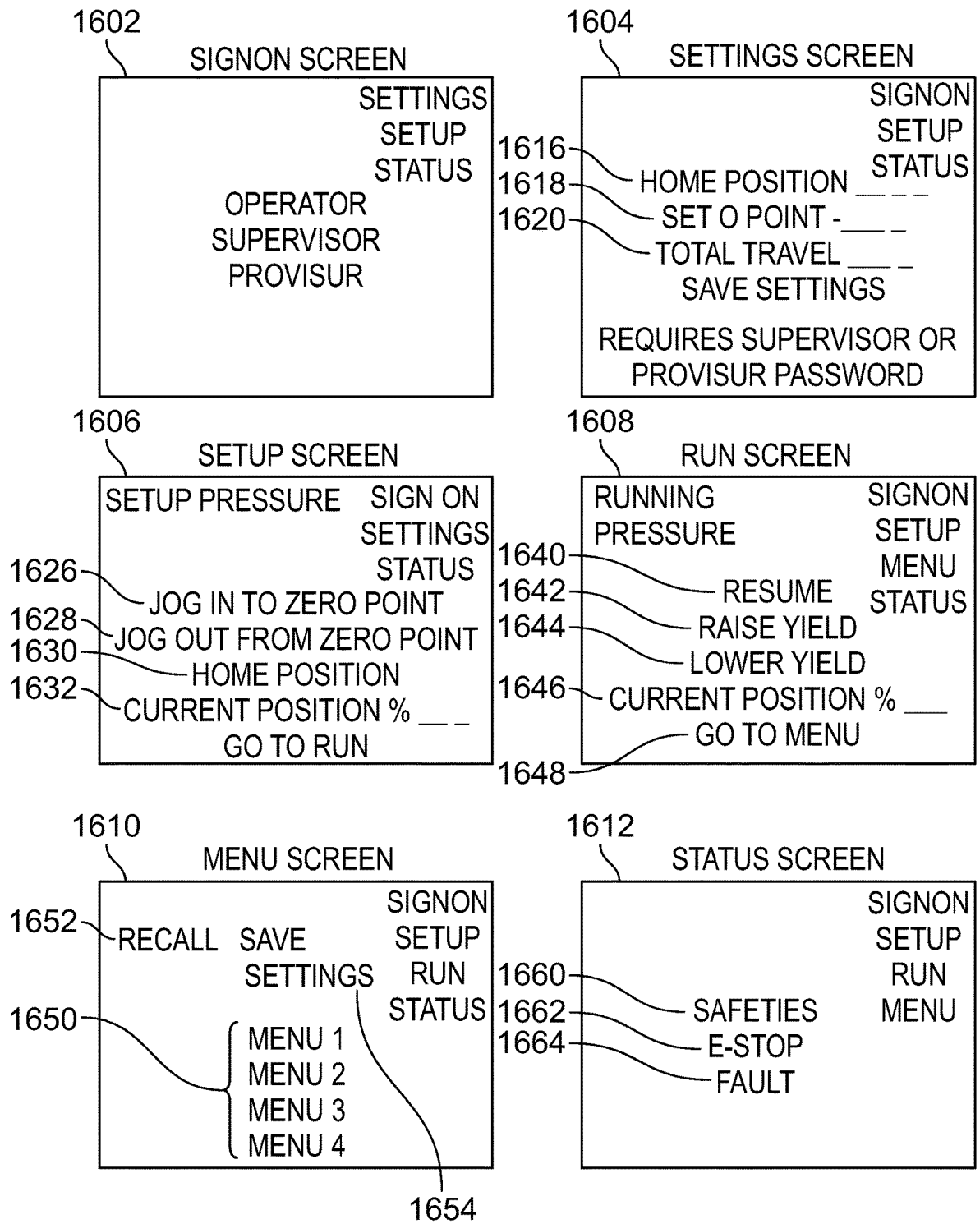
FIG. 17 shows several of the operational menus or screens used for operation of the separation machine.

FIG. 16 describes the operation and screens used for operation of the separation machine 10. FIG. 17 shows several of the operational menus or screens, including a sign-on screen 1602, a settings screen 1604, a set-up screen 1606, a run screen 1608, a menu screen 1610, and a status screen 1612.

The sign-on screen 1602 is displayed when the separation machine 10 is initially powered up. However, the separation machine 10 cannot be started from this screen. Rather, it is the manual starting of separation machine 10 that causes the sign-on screen to 1602 to be displayed. The operator does not need to enter a password to enter the set-up screen 1606, but a password entered by a supervisor is required to access the settings screen 1604.

The settings screen 1604, which requires a password, may be used to calibrate the position of the restrictor ring valve 22 relative to the auger 18, either after installation or as needed due to normal wear. A Home Position indicator 1616 represents a middle position of the ram in the cylinder 92, which is ideally at the middle point of the hydraulic ram 90, and which provides clearance, for example 0.1875 inches, between the restrictor ring valve 22 and the auger 18. In one embodiment, a default position may be 0.000 inches.

A Set Zero Point indicator 1618 represents an offset used to keep the restrictor ring valve 22 and the auger 18 from making contact after the zero point is found. The default position may be 0.020 inches. The "zero point" 1618 of the restrictor ring valve 22 is where the restrictor ring valve 22 has closed the gap 28 and is in minimal contact with the auger 18.

Thereafter, the operator can position the restrictor ring valve 22 in a desired position to control the size of the gap 28 depending upon which product is being processed. This is performed using a low pressure mode to avoid damage to the components. A Total Travel indicator 1620 may represent a length from the home position on the hydraulic ram 90, which may be, for example −0.605 inches to +0.605 inches, for a total of 1.21 inches. Thus, the default total travel length may be 1.21 inches.

The set-up screen 1606 may be used to set the zero point 1618 between the restrictor ring valve 22 and the auger 18. The set-up screen 1606 cannot be accessed unless the separation machine 10 is in a stopped condition. During this set-up, the hydraulic system 52 is in low pressure mode. A Jog In To Zero Point indicator 1626 pushes the hydraulic ram 90 outward, thereby moving the restrictor ring valve 22 into contact minimal contact with the auger 18.

A Jog Out From Zero Point indicator 1628 is typically used only used if a problem is found during the Jog In To Zero Point 1626. A Home Position indicator 1630 is used to move the hydraulic ram 90 back so that the restrictor ring valve 22 moves away from the auger 18 and toward the set zero point 1618, and then back to the home position, as defined in the Settings Screen 1604. A Current Position % indicator 1632 displays an allowed amount of travel from the zero point 1618 at 0% to the total travel point, which is defined in the settings as 100%.

The Run Screen 1608 is used during full operation using high pressure. This is a high pressure setting or mode, and the separation machine 10 can be started at this point. A Resume indicator 1640 is used to resume the last known or used setting. A Raise Yield indicator 1642 may be used to manually move the hydraulic ram 90 outward, which in turn, moves the restrictor ring valve 22 inward, thus raising the separation yield. Increments of the yield adjustment may be in 0.5% increments. A Lower Yield indicator 1644 may be used to manually move the hydraulic ram 90 so as to move the restrictor ring valve 22 outward, thus lowering the separation yield. Increments may be 0.5% increments. A Current Position % indicator 1646 displays the allowed travel from the zero point 1618 at 0% relative to the total travel as defined in the settings as 100%. A Go To Menu indicator 1648 transfers to the menu screen 1610 to recall or set known settings.

The Menu Screen 1610 may be used to recall or save known setting for future use. The operator may recall four different menus, namely recall Menus 1-4 (1650). A Select Recall indicator 1652 may then be used to select the various Menus 1 to 4 (1652). A Save Settings indicator 1654 is used to save the current settings.

The status screen 1612 displays the status of the separation machine 10, for example Safeties 1660, E-Stops 1662, and Faults 1664.

Turning back to FIGS. 2-6, 10, 11 and 14, operation of the cylinder 92 and proportional valve 94 under control of the controller 98 is performed in a closed-loop manner with continuous real-time feedback, in part, due to the input provided by the position sensor 96. In one embodiment, the controller 98 may be programmable logic controller (PLC), however, any suitable computer, microcomputer, and the like may be used.

Under real-time processor control, the controller 98 may continuously determine the position of the restrictor ring valve 22 relative to the auger 18. The position of the restrictor ring valve 22 relative to the auger 18 can be set to a zero position, then set to the desired position depending upon the product being processed. Once set to the desired position, the restrictor ring valve 22 remains in a static position until adjusted or commanded to move.

If the separation machine 10 is used to run multiple types of product in during the same run, the position of the restrictor ring valve 22 relative to the auger 18 can be precisely controlled using the hydraulic system 52 as directed by the operator using the various menus described above. The positional feedback provided by the controller 98 in conjunction with the position sensor 96 permits repeatable and accurate zeroing and setting of the position of the restrictor ring valve 22 relative to the auger 18.

The separation machine 10 may operate in the first mode during initialization of the separator, and the second mode during operational processing the food product, where the first mode is a low pressure mode and the second mode is a high pressure mode. The low pressure mode is used only for non-operational set-up applications as described above, such as where the restrictor ring valve 22 is zeroed out or moved to a minimal distance from the auger 18.

As described above, the hydraulic ram 90 may move at approximately a 3:1 ratio relative to the restrictor ring valve 22, and may move at a 2.8083:1 ratio relative to the restrictor ring valve 22. The total absolute movement of the restrictor ring valve 22 may be about 0.375 inches, while total absolute movement of the hydraulic ram 90 may be about 1.052 inches in certain embodiments. The hydraulic ram 90 may be specified with a 2.00 stroke.

Because the restrictor ring valve 22 has been zeroed during start up, this zeroed position prevents the restrictor ring valve 22 from contacting the auger 18 during operation, and avoids damaging components during travel. While using the low pressure setting or mode, the hydraulic ram 90 may be extended about 0.526 inches, which in turn, moves the restrictor ring valve 22 about 0.1875 inches until restrictor ring valve 22 makes contact with the end of the auger 18.

When the separation machine 10 is switched to the operational mode using the run screen, the hydraulic ram 90 retracts about 0.02 inches to set the zero point. At this point, the hydraulic ram 90 should not be able to extend beyond this zero point or retract more than 1.05 inches when fully open. During normal shut down, the hydraulic ram 90 is configured to retract the restrictor ring valve 22 back to the nominal or middle position for easier disassembly and cleaning. During an emergency stop situation, all movement of the separation machine 10 ceases.

The menu screen 1610, also commonly called a human machine interface, may have a "recipe" screen with several pre-set set points for the customer. The customer can pick a recipe before the separation machine 10 can be started normally. The operator may be able to jog the restrictor ring valve 22 in or out for fine tuning and for resetting set points. During operation, the hydraulic system 52, using the high pressure mode, may receive feedback from the position sensor 96 to hold the set position without movement. Restarting the separation machine 10 without powering down would resume the previous position. For example, from the nominal or zero position, extending the hydraulic ram 90 about 0.526 inches would move the restrictor ring valve 22 a distance of about 0.1875 inches to a full closed position. Retracting hydraulic ram 90 about 0.526 inches would conversely move restrictor ring valve 22 a distance of about 0.1875 inches to a fully open position.

Many modifications and other embodiments of the disclosure set forth herein will come to mind to one skilled in the art to which these disclosed embodiments pertain having the benefit of the teachings presented in the foregoing descriptions and the associated drawings.

It is to be understood that the disclosure is not to be limited to the specific embodiments disclosed herein and that modifications and other embodiments are intended to be included within the scope of the disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A powered separation machine comprising:
   a housing;
   a separation chamber mounted to the housing, the separation chamber configured to receive and process a food product therethrough, the separation chamber having a cylindrical screen including a plurality of apertures;
   a feed tube configured to provide the food product to an input end of the separation chamber;
   a rotating auger disposed within the separation chamber and defining an annular space and a volume between the auger and the screen;
   a restrictor ring mounted to an output end of the separation chamber, the restrictor ring configured to be linearly and reciprocally displaceable, wherein linear displacement of the restrictor ring varies a size of the volume between the auger and the screen;
   a hydraulic cylinder having a reciprocating ram;
   a proportional hydraulic valve operatively coupled to the hydraulic cylinder;
   a pivoting adjustment bracket operatively coupled between the ram and the restrictor ring;
   wherein extension of the ram causes pivoting movement of the adjustment bracket so as to linearly translate the restrictor ring in a first direction to reduce the size of the volume, and wherein retraction of the ram causes pivoting movement of the adjustment bracket to linearly translate the restrictor ring in a second direction so as to increase the size of the volume; and
   a controller operatively coupled to the proportional hydraulic valve so as to control the hydraulic cylinder in a closed-loop manner.

2. The powered separation machine of claim 1, wherein the proportional hydraulic valve and the hydraulic cylinder comprise a hydraulic subsystem, the hydraulic subsystem physically located with the housing and is physically isolated from the separation chamber to avoid contamination.

3. The powered separation machine of claim 2, wherein the hydraulic subsystem includes a position sensor that provides a varying electrical signal proportional to a position of the ram relative to the cylinder.

4. The powered separation machine of claim 2, wherein the controller receives a signal from a position sensor operatively coupled to the hydraulic subsystem.

5. The powered separation machine of claim 2, wherein the hydraulic subsystem operates in a first mode used during initialization of the separator, and used in a second mode during operational processing the food product.

6. The powered separation machine of claim 5, wherein the first mode is a low pressure mode and the second mode is a high pressure mode.

7. The powered separation machine of claim 1, wherein the hydraulic cylinder is disposed in a horizontal position parallel to a longitudinal axis of the separation chamber.

8. The powered separation machine of claim 1, wherein the ram reciprocally extends and retracts in a horizontal direction parallel to the separation chamber.

9. The powered separation machine of claim 1, further including a driving rod operatively coupled between the ram and pivoting adjustment bracket.

10. The powered separation machine of claim 9, wherein the driving rod is disposed externally relative to the housing and external relative to the separation chamber.

11. The powered separation machine of claim 9, further including an external pressure gauge operatively coupled to the driving rod configured to provide a visual indication of a level of pressure exerted by the ram.

12. The powered separation machine of claim 9, wherein the pivoting adjustment bracket is operatively coupled to the driving rod at a first end, and operatively coupled to the restrictor ring at a second end, the second end disposed opposite the first end, the pivoting adjustment bracket further including a fulcrum point between the first and second ends about which the adjustment bracket pivots.

13. The powered separation machine of claim 12, wherein the fulcrum point is located at a position closer to the second end of the adjustment bracket than to the first end of the adjustment bracket.

14. The powered separation machine of claim 12, wherein a distance from the fulcrum point to the first end of the adjustment bracket is about twice the distance compared to a distance from the fulcrum point to the second end of the adjustment bracket, so as to provide a mechanical force advantage of about 3:1.

15. The powered separation machine of claim 13, wherein the proportional hydraulic valve and the hydraulic cylinder comprise a hydraulic subsystem, and the hydraulic subsystem operates in a first mode used during initialization of the separator, and used in a second mode during operational processing the food product, wherein the restrictor ring is moved to a position that is a minimum distance from the auger without contacting the auger while in the first mode of operation.

16. A powered separator comprising:
a separation chamber configured to receive and process a food product therethrough, the separation chamber having a cylindrical screen including a plurality of apertures;
a rotating auger disposed within the separation chamber and defining an annular space and a volume between the auger and the screen;
a restrictor ring mounted at an output end of the separation chamber, the restrictor ring configured to be linearly and reciprocally displaceable, wherein linear displacement of the restrictor ring varies a size of the volume between the auger and the screen;
a hydraulic cylinder having a reciprocating ram;
a proportional hydraulic valve operatively coupled to the hydraulic cylinder;
wherein extension of the ram causes pivoting movement of the restrictor ring in a first direction to reduce the size of the volume, and wherein retraction of the ram causes movement of the restrictor ring in a second direction so as to increase the size of the volume; and
a controller operatively coupled to the proportional hydraulic valve so as to control the hydraulic cylinder in a closed-loop manner.

17. The powered separator of claim 16, further including a pivoting adjustment bracket operatively coupled between the ram and the restrictor ring.

18. The powered separator of claim 16, wherein the proportional hydraulic valve and the hydraulic cylinder comprise a hydraulic subsystem, the hydraulic subsystem physically located with a housing, wherein the housing is physically isolated from the separation chamber to avoid contamination.

* * * * *